(12) United States Patent (10) Patent No.: US 8,483,433 B1
Laflen et al. (45) Date of Patent: Jul. 9, 2013

(54) DETECTION OF FAINT PERTURBATIONS OF INTEREST USING STATISTICAL MODELS OF IMAGE TEXTURE

(75) Inventors: John Brandon Laflen, Niskayuna, NY (US); Glen William Brooksby, Glenville, NY (US); Robert A. Kaucic, Niskayuna, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 377 days.

(21) Appl. No.: 12/885,348

(22) Filed: Sep. 17, 2010

Related U.S. Application Data

(60) Provisional application No. 61/243,515, filed on Sep. 17, 2009.

(51) Int. Cl.
*G06K 9/00* (2006.01)
(52) U.S. Cl.
USPC ............................. 382/103; 382/155; 382/159
(58) Field of Classification Search
USPC ................. 382/103–105, 155, 159, 160, 165, 382/190–195, 224–228, 260–273
See application file for complete search history.

(56) References Cited

U.S. PATENT DOCUMENTS

| | | | |
|---|---|---|---|
| 5,828,769 A | 10/1998 | Burns | |
| 5,912,993 A | 6/1999 | Puetter et al. | |
| 6,226,417 B1 | 5/2001 | Yamagata et al. | |
| 6,473,029 B1 | 10/2002 | Powers | |
| 6,647,132 B1 | 11/2003 | Montillo et al. | |
| 6,728,406 B1 | 4/2004 | Murao | |
| 6,753,965 B2 | 6/2004 | Kumar et al. | |
| 6,941,015 B1 | 9/2005 | Kim et al. | |
| 7,107,192 B1 | 9/2006 | Cung et al. | |
| 7,113,944 B2 | 9/2006 | Zhang et al. | |
| 7,129,943 B2 | 10/2006 | Zhang et al. | |
| 7,149,368 B2 | 12/2006 | Tong et al. | |
| 7,161,601 B2 | 1/2007 | Zhang et al. | |
| 7,171,030 B2 | 1/2007 | Foran et al. | |
| H2179 H | 2/2007 | Egan | |
| 7,212,671 B2 | 5/2007 | Kim et al. | |
| 7,340,098 B2 | 3/2008 | Motomura et al. | |
| 8,218,850 B2 * | 7/2012 | Raundahl et al. | ............. 382/132 |
| 2004/0151356 A1 * | 8/2004 | Li et al. | ......................... 382/131 |

\* cited by examiner

*Primary Examiner* — Brian Le

(74) *Attorney, Agent, or Firm* — McDermott Will & Emery LLP

(57) ABSTRACT

A system for detecting faint perturbations of interest in an image is described. The system includes a memory comprising the image, and a processor. The processor is configured to estimate a local mean and variance for each of a plurality of pixels in the image, analyze a local region of the image, an image mean, and an image variance using a filter bank, thereby generating a plurality of response vectors, determine a likelihood of a local perturbation in the image using a probability distribution based on the plurality of response vectors, and make a classification decision of the local perturbation. The probability distribution is calculated, for each of the plurality of response vectors, based on a response of each of the plurality of response vectors to the estimated local mean and variance for each of the plurality of pixels. Methods and machine-readable media are also described.

19 Claims, 12 Drawing Sheets

120

130

140

210

380

390

DETECTION OF FAINT PERTURBATIONS OF INTEREST USING STATISTICAL MODELS OF IMAGE TEXTURE

CROSS-REFERENCE TO RELATED APPLICATIONS

The present application claims the benefit of priority under 35 U.S.C. §119 from U.S. Provisional Patent Application Ser. No. 61/243,515 entitled "DETECTION OF FAINT PERTURBATIONS OF INTEREST USING STATISTICAL MODELS OF IMAGE TEXTURE," filed on Sep. 17, 2009, the disclosure of which is hereby incorporated by reference in its entirety for all purposes.

STATEMENT AS TO RIGHTS TO INVENTIONS MADE UNDER FEDERALLY SPONSORED RESEARCH OR DEVELOPMENT

Not applicable.

FIELD OF THE INVENTION

The present invention generally relates to image processing, and, in particular, relates to the detection of objects of interest within images.

BACKGROUND OF THE INVENTION

The detection of objects of interest is an important aspect of many areas, such as defense systems, where an object of interest could be an approaching missile. In many instances, detecting an object of interest is made difficult because of a noisy background, such as a background of clouds when attempting to detect the approaching missile. Systems such as computers are often tasked with the responsibility of detecting the objects of interest. When attempting to detect an object of interest, these systems often suffer from the same difficulties suffered by the human eye, namely an object of interest blending into the background.

SUMMARY OF THE INVENTION

For purposes of summarizing the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

According to one embodiment of the present disclosure, a method for detecting faint perturbations of interest in an image is provided. The method includes estimating a local mean and variance for each of a plurality of pixels in the image, and analyzing, using a processor, a local region of the image, an image mean, and an image variance using a filter bank, thereby generating a plurality of response vectors. The method also includes determining a likelihood of a local perturbation in the image using a probability distribution based on the plurality of response vectors, and making a classification decision of the local perturbation. The probability distribution is calculated, for each of the plurality of response vectors, based on a response of each of the plurality of response vectors to the estimated local mean and variance for each of the plurality of pixels.

According to one embodiment of the present disclosure, a system for detecting faint perturbations of interest in an image is provided. The system includes a memory comprising the image, and a processor. The processor is configured to estimate a local mean and variance for each of a plurality of pixels in the image, analyze a local region of the image, an image mean, and an image variance using a filter bank, thereby generating a plurality of response vectors, determine a likelihood of a local perturbation in the image using a probability distribution based on the plurality of response vectors, and make a classification decision of the local perturbation. The probability distribution is calculated, for each of the plurality of response vectors, based on a response of each of the plurality of response vectors to the estimated local mean and variance for each of the plurality of pixels.

According to one embodiment of the present disclosure, a machine-readable medium comprising machine-readable instructions for causing a processor to execute a method for detecting faint perturbations of interest in an image is provided. The method includes estimating a local mean and variance for each of a plurality of pixels in the image, and analyzing, using a processor, a local region of the image, an image mean, and an image variance using a filter bank, thereby generating a plurality of response vectors. The method also includes determining a likelihood of a local perturbation in the image using a probability distribution based on the plurality of response vectors, and making a classification decision of the local perturbation. The probability distribution is calculated, for each of the plurality of response vectors, based on a response of each of the plurality of response vectors to the estimated local mean and variance for each of the plurality of pixels.

Additional features and advantages of the invention will be set forth in the description below, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements.

DETAILED DESCRIPTION OF EXEMPLARY EMBODIMENTS

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail so as to not obscure the present invention.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

Figure 1:
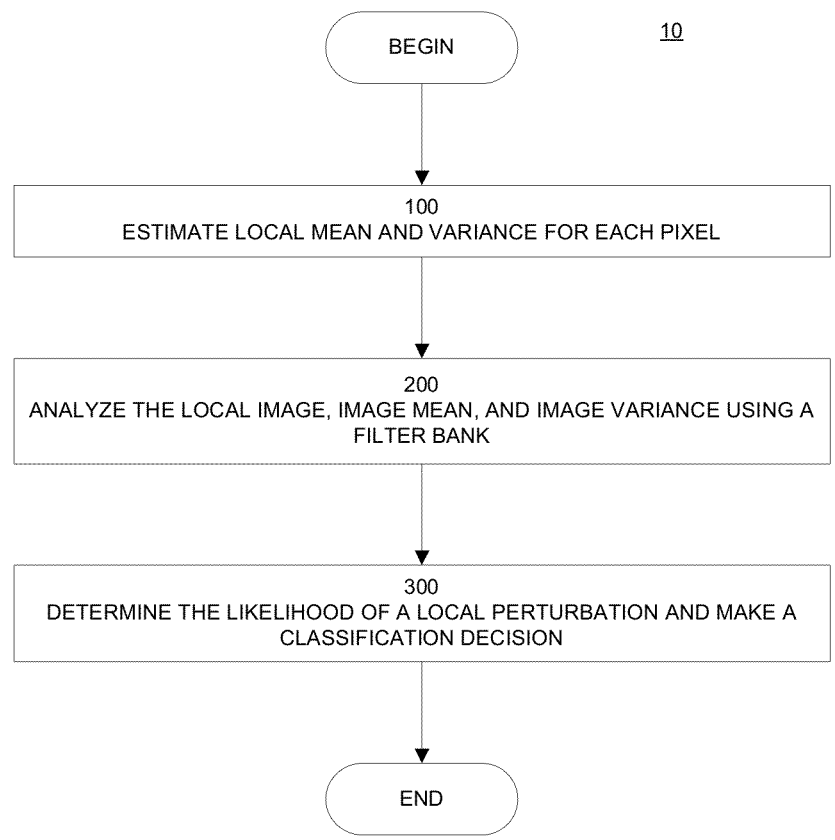
FIG. 1 is an exemplary process for detecting faint perturbations of interest using statistical models of image texture according to certain embodiments of the disclosure.

FIG. 1 is an exemplary process 10 for detecting faint perturbations (or targets) of interest using statistical models of image texture according to certain embodiments of the disclosure. The process 10 includes three steps 100, 200, and 300. The first step 100 is to estimate a local mean and variance for each of a plurality of pixels. The second step 200 is to analyze a local image, image mean, and image variance using a filter bank. The third and final step 300 is to determine the likelihood of a local perturbation and make a classification decision. The process 10 then ends.

The first step 100 of estimating a local mean and variance (or "local image noise") for each of a plurality of pixels can be implemented according to various processes. For example, in certain systems, image noise may be well defined by physical processes. In this case, local noise may be determined experimentally, such as by determining expected local image noise experimentally. This will result in a mean value and variance value for each image coordinate.

In certain other systems, it is desirable that image noise be estimated empirically at run-time. In these systems, the process 100' of FIG. 2A may be used, which estimates image noise using population statistics. The process 100' of FIG. 2A begins in a loop of steps 101 through 105, where, for each incoming image, in step 102 the image is added to a buffer of images of size N+K in order to fill the buffer, where N is the number of samples for estimating the image statistics, greater than or equal to two, and K is the number of samples for estimating the current (probe) image, greater than or equal to one. If the buffer is not full in decision step 103, the process 100' continues to fill the buffer in end loop step 105 by returning to beginning loop step 101. If, however, the buffer is full as decided in decision step 103, the process 100' proceeds to step 104 in which the least recent image, the $(N+K)^{th}$ image, is replaced with the current image, and the process 100' then proceeds to optional step 106. In optional step 106, the N+K images are registered to the current image, which can improve performance of the process 100'. In certain embodiments, possible registration algorithms include, but are not limited to, maximizing normalized cross-correlation, mutual information, and Fourier techniques, such as maximizing phase correlation. In step 107, the mean pixel intensity for each pixel is estimated. Step 107 may be completed in various ways, for example, depending on the image formation and noise model used for the process 10. One possible way is by calculating the sample mean for a pixel at location (x,y) in the image using the following formula $$\mu(x, y) = \frac{1}{N} \sum_{n=K+1}^{K+N} i_n(x, y)$$

where $i_n(x,y)$ is the $n^{th}$ image in the buffer, with n=K+1 ... K+N signifying the least recent N images. Step 107 can be repeated on the most recent K images in the buffer to estimate the current (or "probe") image.

Finally, in step 108, the pixel intensity variance for each pixel is estimated. Step 108 may also be completed in various ways, for example, depending on the image formation and noise model used for the process 10. One possible way is by calculating the sample variance for a pixel at location (x,y) in the image using the formula $$\sigma^2(x, y) = \frac{1}{N-1} \sum_{n=K+1}^{K+N} [i_n(x, y) - \mu(x, y)]^2$$

where $i_n(x,y)$ is the $n^{th}$ image in the buffer, with n=K+1 ... K+N signifying the least recent N images. The process 100' continues with step 200 of FIG. 1, which is detailed in FIG. 3A.

Figure 2A:
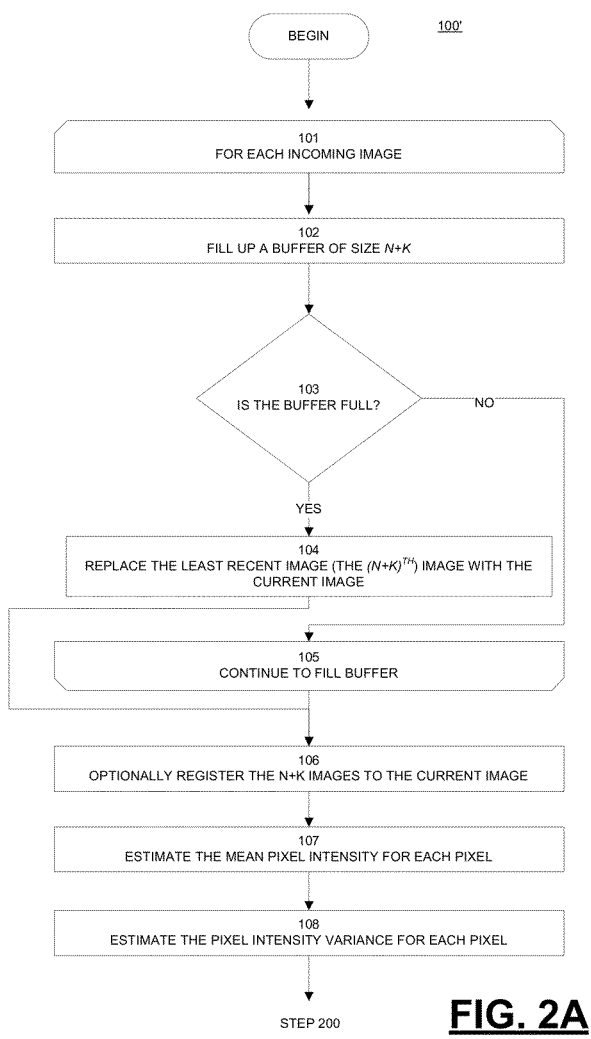
FIG. 2A is a first exemplary process for estimating a local mean and variance for each of a plurality of pixels according to the process of FIG. 1.
Figure 2B:
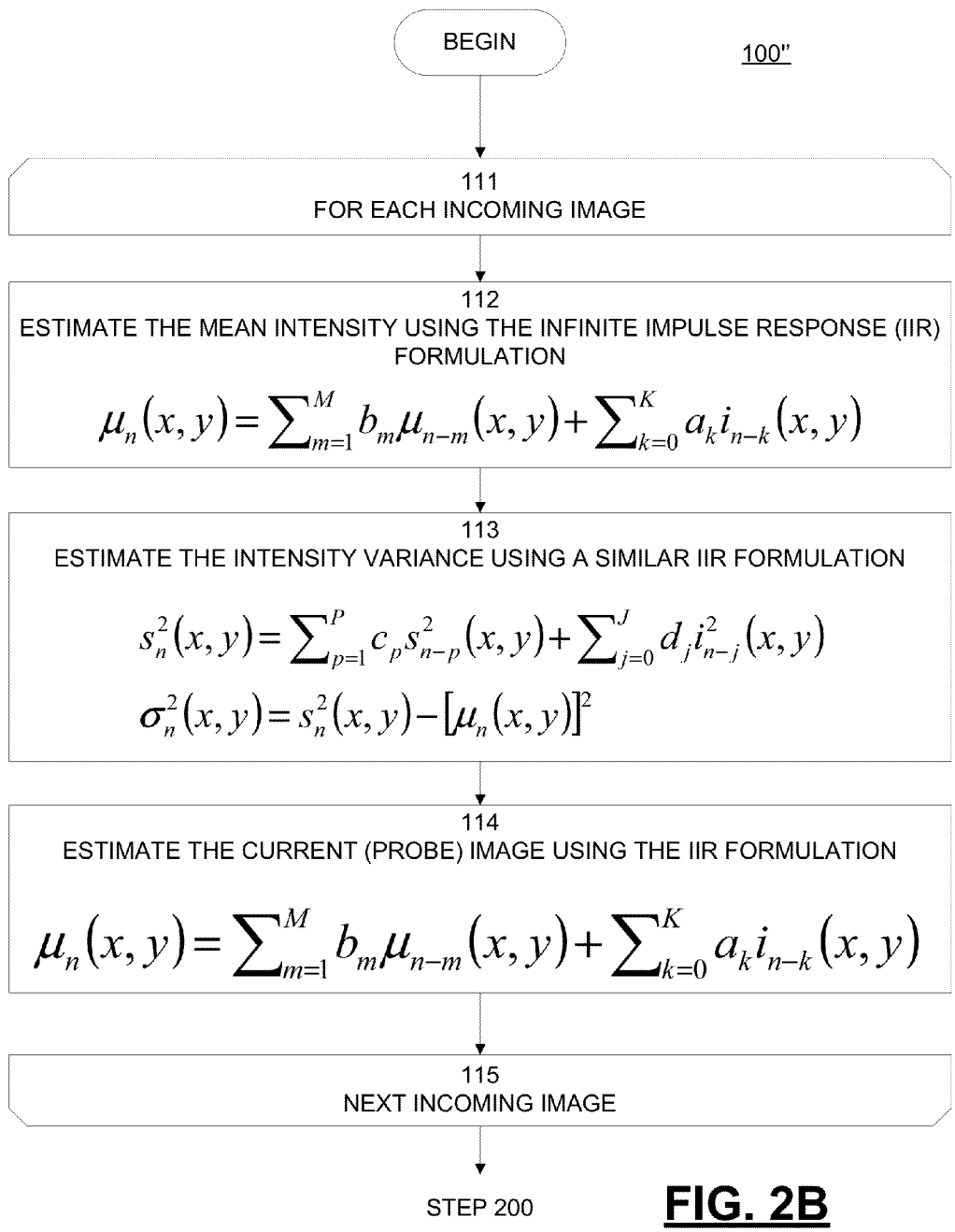
FIG. 2B is a second exemplary process for estimating a local mean and variance for each of a plurality of pixels according to the process of FIG. 1.

FIG. 2B is a second exemplary process 100" for the estimating the local mean and variance for each of the plurality of pixels according to the process 10 of FIG. 1. The process 100" of FIG. 2B may be used to estimate mean and variance when needed (without advanced preparation) using infinite impulse response (IIR) filters. The process 100" begins with beginning loop step 111, which repeats steps 111 to 115 for each incoming image. In step 112, the mean intensity for the incoming image is estimated using the IIR formulation $$\mu_n(x, y) = \sum_{m=1}^{M} b_m \mu_{n-m}(x, y) + \sum_{k=0}^{K} a_k i_{n-k}(x, y)$$

where M can be any integer greater than or equal to 0, K can be any integer greater than 0, a buffer of size M+K is required to hold the filter intermediates, and $b_m$ and $a_k$ are coefficients that control the filter response and can be chosen to match the application. In certain embodiments, one method for choosing coefficients $b_m$ and $a_k$ is to implement a low-pass filter of a specific order, such as Butterworth, Chebyshev, or Elliptical filters.

Next, in step 113, intensity variance is estimated using a similar IIR formulation $$s_n^2(x, y) = \sum_{p=1}^{P} c_p s_{n-p}^2(x, y) + \sum_{j=0}^{J} d_j i_{n-j}^2(x, y)$$

$$\sigma_n^2(x, y) = s_n^2(x, y) - [\mu_n(x, y)]^2,$$

where P can be any integer greater than or equal to 0, J can be any integer greater than 0, and a buffer of size P+J is required to hold the filter intermediates. The total buffer size is M+P+max(J,K), and $c_p$ and $d_j$ are coefficients that control the filter response, and can be chosen to match the application. The coefficients $c_p$ and $d_j$ can be the same as a and b in step 112, or chosen in a fashion similar to step 112. In step 114, a similar step as step 112 can be used to estimate the current image, namely using the same IIR formulation $$\mu_n(x, y) = \sum_{m=1}^{M} b_m \mu_{n-m}(x, y) + \sum_{k=0}^{K} a_k i_{n-k}(x, y)$$

In certain embodiments, different filter coefficients for step 114 are selected so as to achieve both a different time interval (e.g., more recent) and an orthogonal response to the long-term mean response. The process 100' continues with step 200 of FIG. 1, which is detailed in FIG. 3A.

Figure 2C:
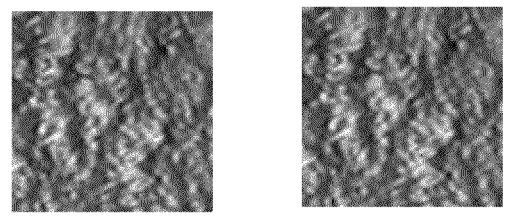
FIGS. 2C-2E are exemplary images representing the progression of input images according to the processes of FIGS. 2A and 2B.
Figure 2D:
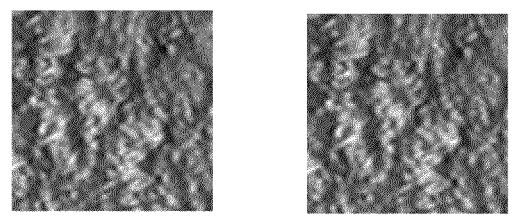
Figure 2E:
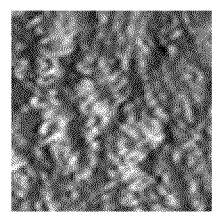

FIG. 2C includes four exemplary input images 120 that represent a progression using the above processes 100' or 100''. FIG. 2D is an exemplary image 130 that represents a possible mean image across the input images 120 of FIG. 2C, and FIG. 2E is an exemplary image 140 that represents a possible variance image across the input images 120 of FIG. 2C.

Figure 3A:
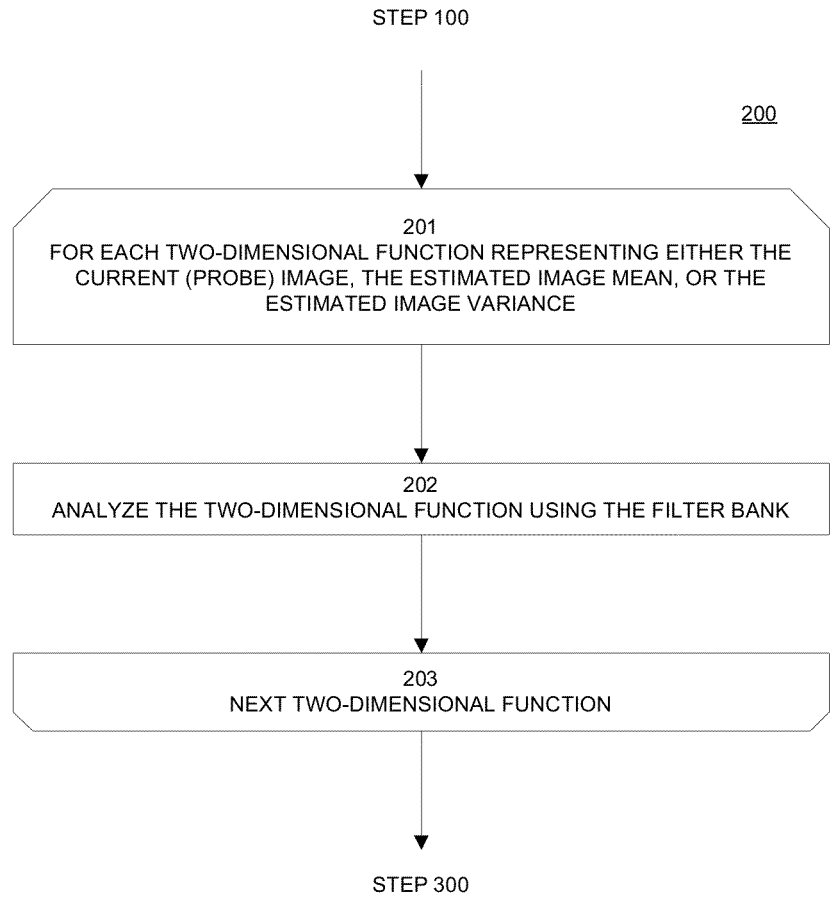
FIG. 3A is an exemplary process for analyzing a local image, image mean, and image variance using a filter bank according to the process of FIG. 1.

Proceeding to step 200 of the process 10 of FIG. 1, which continues from step 108 of the process 100' of FIG. 2A or step 115 of the process 100'' of FIG. 2B, an analysis of the local image, image mean, and image variance using a filter bank may occur according to the exemplary process 200 of FIG. 3A. In certain embodiments, the current image, or its estimate (e.g., if K>0 in process 100 above), the estimated image mean, and the estimated image variance can all be represented as a two-dimensional function f(x,y).

With reference to the process 200 of FIG. 3A, step 201 represents a beginning loop step that repeats through step 203 for each such two-dimensional function, that is, each two-dimensional function that represents either the current image, the estimated image mean, or the estimated image variance.

In step 202, the two-dimensional function is analyzed using a filter bank. The filter bank contain B filters. The $b^{th}$ filter is specified in continuous form as $$h_b(\rho,\theta) = R_b(\rho) \exp[\theta q_b \sqrt{-1}]$$

where $(\rho,\theta)$ are polar coordinates $\rho=(x^2+y^2)^{1/2}$, $\theta = a\tan(y/x)$, and $q_b$ can be any integer. In certain embodiments, $R_b$ can be any radial function, except that for any two filters $h_b$ and $h_{b'}$, if $q_b = q_{b'}$, then the radial functions must be orthogonal according to the formula $$\int_{\rho=0}^{\infty} \rho R_b(\rho) R_{b'}(\rho) d\rho = 0$$

In certain embodiments, the filter should be discretized using a suitable sampling resolution to approximately retain the orthogonality and rotational invariance of the filter bank. Sampling of the filter produces a discrete form $h_b(x,y)$. Exemplary filter sets that may be used from the filter bank include Zernike Polynomial Filters, or filters according to the formula $$h_b(\rho,\theta) = 1_{\{\rho \le 1\}} \cdot e^{b\theta\sqrt{-1}}$$

For each filter, the rotationally-variant filter response is, in certain embodiments, obtained by convolution of the filter with the two-dimensional function. For location (x,y) in the function, the operation is $$r_b(x, y) \sum_i \sum_j f(x-i, y-j) h_b(i, j)$$

where f(x,y) can be the current image or its estimate, the estimated image mean, or the estimated image variance.

The filter bank can also be computed in the Fourier domain. Thus, in certain embodiments, the rotationally-variant filter response is alternatively obtained for each filter by use of the Fourier transform (e.g., the fast Fourier transform). To compute the Fourier transform, the first step of computing F(u,v)=FFT{f(x,y)} and $H_b$(u,v)=FFT{$h_b$(x,y)} is not required if the Fourier transform of the corresponding function is already defined, known, or can be otherwise expressed analytically. The second step of the computation is to compute the Fourier response $R_b$(u,v)=F(u,v)*$H_b$(u,v), and the final step is to compute the filter response $r_b$(x,y)=IFFT{$R_b$(u,v)}, where FFT is the fast-Fourier transform operator, and IFFT is the inverse fast-Fourier transform operator. FFT and IFFT are readily available through numerous numerical packages known to those of ordinary skill in the art.

After calculating the rotationally-variant response, the rotationally-invariant response is optionally stored in a memory. The rotationally-invariant response is the magnitude-squared of the rotationally-variant response (i.e., the filter response). The process 200 then proceeds to the next two-dimensional function in end loop step 203 by returning to beginning loop step 201. After analysis of all of the two-dimensional functions by the B filters in the filter bank, each pixel has a representation of B responses (from each of the B filters), comprising a B-vector field across the ensemble of pixels in the two-dimensional function. There is one set of B-vector fields each of the current image or its estimate, the image mean, and the image variance. The process 200 continues with step 300 of FIG. 1, which is detailed in FIG. 4A.

Figure 3B:
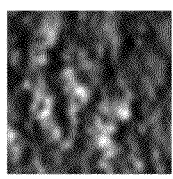
FIG. 3B includes exemplary images representing the first 12 Zernike polynomial filter responses to the image of FIG. 2D.
Figure 3B:
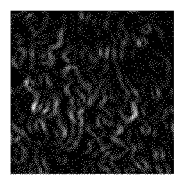
Figure 3B:
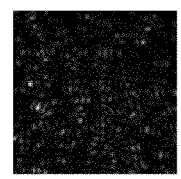
Figure 3B:
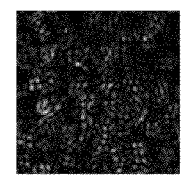
Figure 3B:
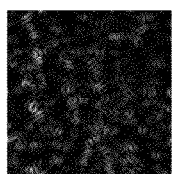
Figure 3B:
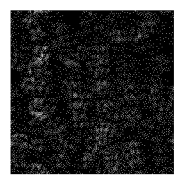
Figure 3B:
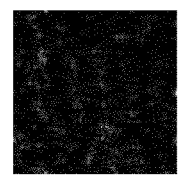
Figure 3B:
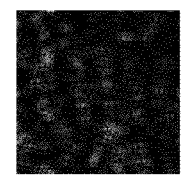
Figure 3B:
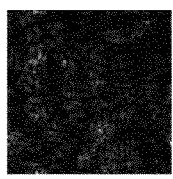
Figure 3B:
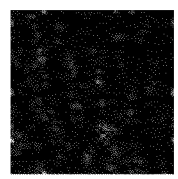
Figure 3B:
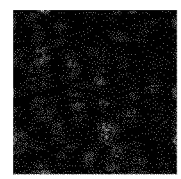
Figure 3B:
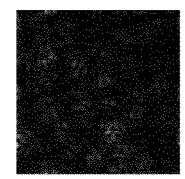

FIG. 3B includes exemplary images 210 representing the first 12 Zernike polynomial filter responses to the image of FIG. 2D based on the process 200 of FIG. 3A. The application of likelihood-based classifiers as discussed below with reference to FIGS. 4C and 4D are based upon an identification of what the local perturbation may look like in the images, e.g., exemplary images 210. Given the identification, the center of a perturbation image is processed using the process 200 of FIG. 3A, creating an expected response vector for that image. If multiple perturbations are anticipated and known, then a response vector is generated for each perturbation. In certain embodiments, for the response vectors generated from the steps 100 and 200 of process 10, a given pixel is in certain embodiments classified as defective (i.e., containing a perturbation or target) or non-defective (i.e., not containing a perturbation or target). In certain embodiments, this classification is not binary; it can be expressed probabilistically, e.g., the probability that a given pixel is defective.

Figure 4A:
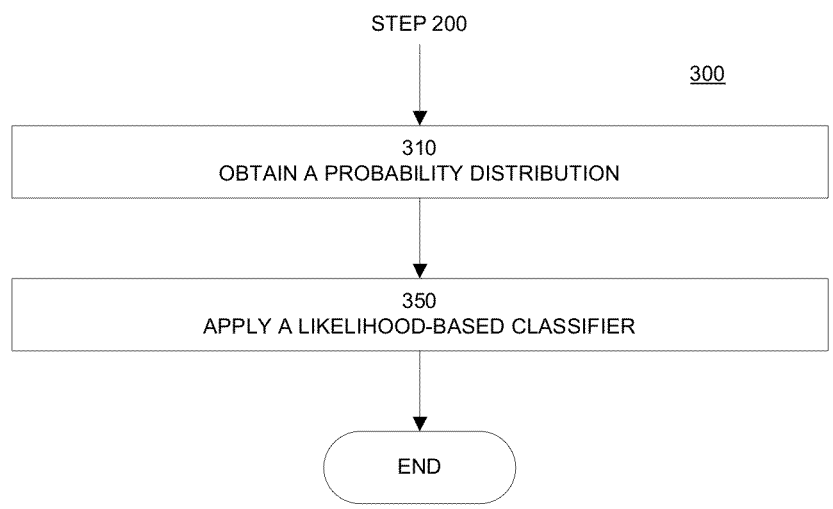
FIG. 4A is an exemplary process for determining a likelihood of a local perturbation and making a classification decision according to the process of FIG. 1.

Proceeding to the final step 300 of the process 10 of FIG. 1, which continues from step 203 of the process 200 of FIG. 3A, a determination of a likelihood of a local perturbation and a classification decision are made according to the exemplary process 300 of FIG. 4A. The process 300 includes a first step 310 of obtaining a probability distribution, and a second step 350 of applying a likelihood-based classifier. The process 300 then ends, thereby completing the process 10 of FIG. 1.

Figure 4B:
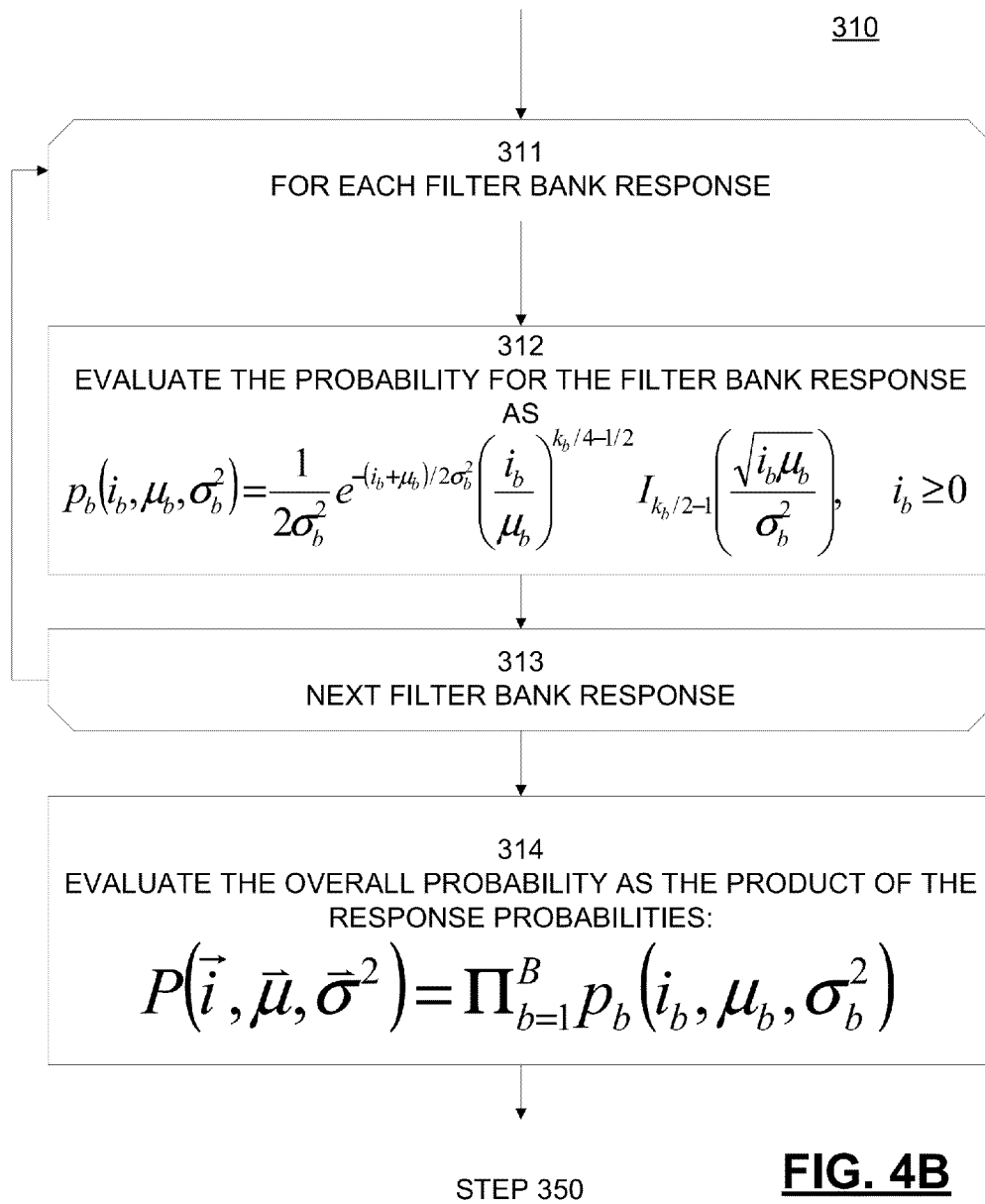
FIG. 4B is an exemplary process for obtaining a probability distribution according to the process of FIG. 4A.
Figure 4C:
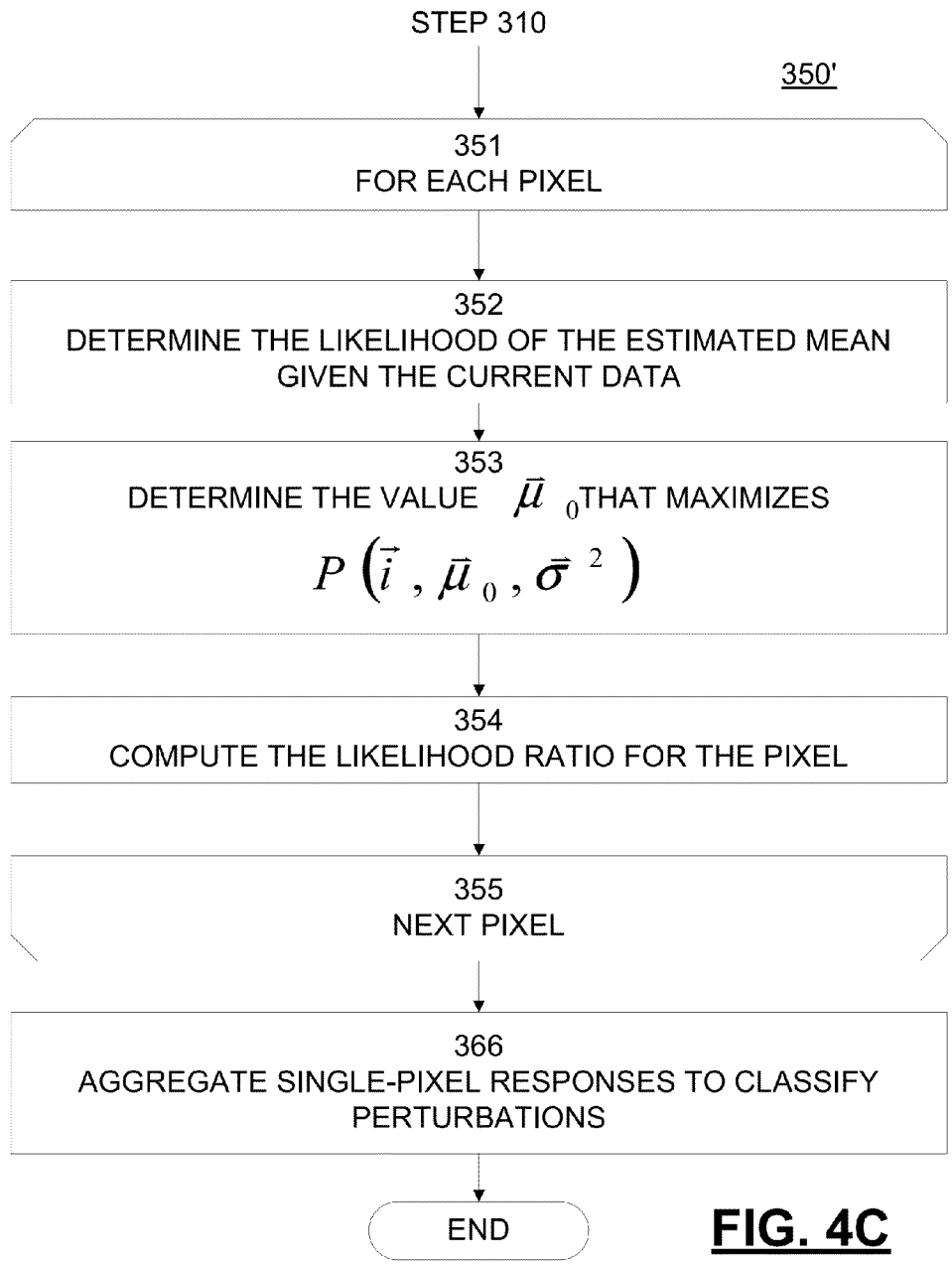
FIG. 4C is a first exemplary process for applying a likelihood-based classifier according to the process of FIG. 4A.
Figure 4D:
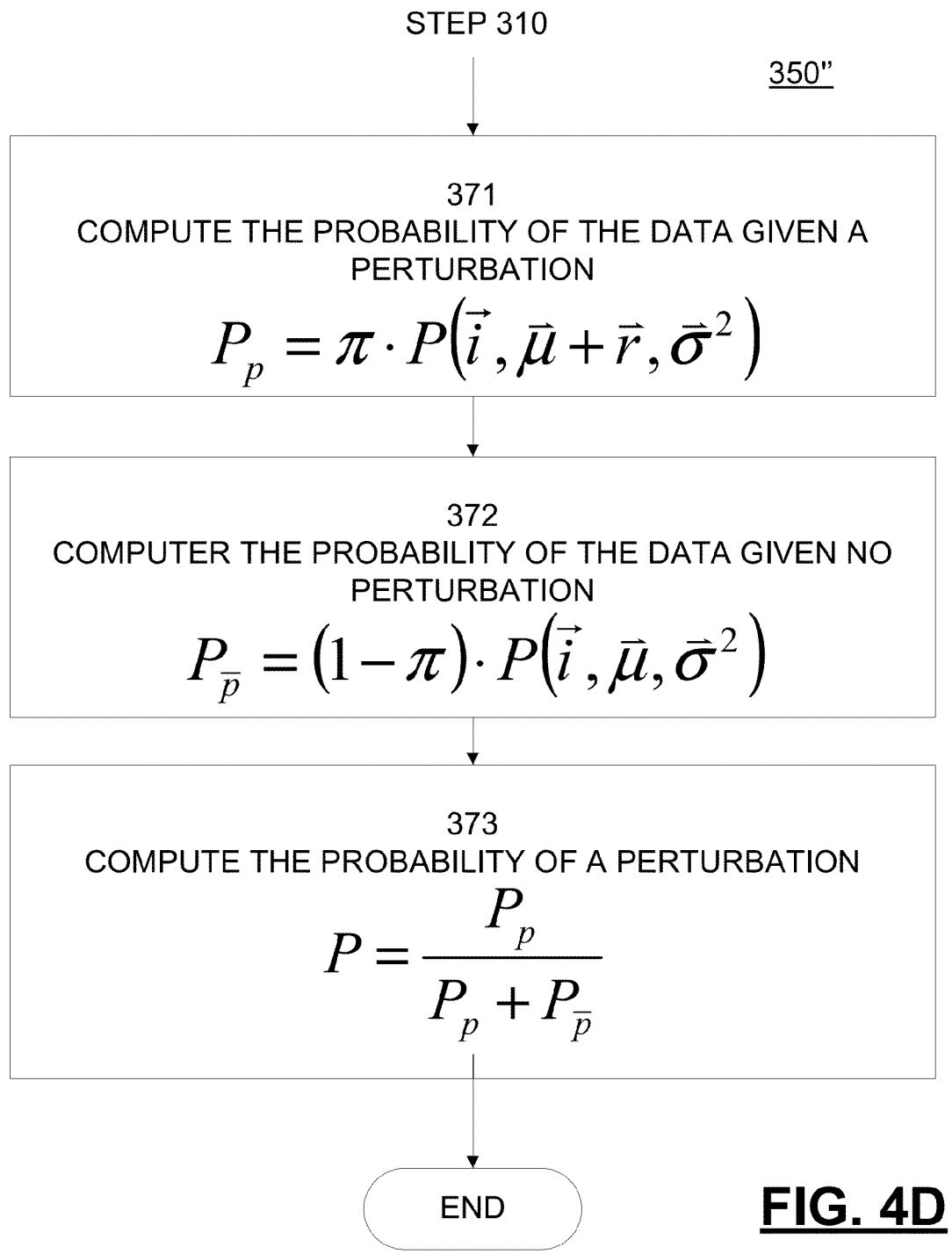
FIG. 4D is a second exemplary process for applying a likelihood-based classifier according to the process of FIG. 4A.

FIG. 4B is an exemplary process 310 for obtaining a probability distribution according to the process 300 of FIG. 4A. The process 310 uses a probability distribution for the filter bank response. In certain embodiments, this distribution is computed assuming three filter-bank response vectors. A first filter-bank response vector is a response to the current image (or its estimate), called $\vec{i}=\{i_b(x,y)\}$, a second filter-bank response vector is a response to the estimated mean, called $\vec{\mu}=\{\mu_b(x,y)\}$, and a third filter-bank response vector is a response to the estimated variance, called $\vec{\sigma}^2=\{\sigma_b^2(x,y)\}$. In certain embodiments, (x,y) is understood and can be dropped, where appropriate.

The process 310 of FIG. 4B begins with beginning loop step 311, which repeats steps 311 to 313 for each filter bank response. In step 312, the probability distribution for the filter bank response is calculated based on a response of each of the plurality of response vectors to the estimated local mean and variance for each of the plurality of pixels. For example, this calculation can be evaluated as $$p_b(i_b, \mu_b, \sigma_b^2) = \frac{1}{2\sigma_b^2} e^{-(i_b+\mu_b)/2\sigma_b^2} \left(\frac{i_b}{\mu_b}\right)^{k_b/4-1/2} I_{k_b/2-1}\left(\frac{\sqrt{i_b\mu_b}}{\sigma_b^2}\right),$$

$$i_b \geq 0$$

where the (x,y) is understood and dropped in the above equation, $k_b$ is 1 if $q_b=0$, otherwise $k_b$ is 2, and $I_k$ is a modified Bessel function of the first kind. The process 310 proceeds to the next filter bank response in step 313. When no filter bank responses remain, the process 310 proceeds to step 313, where the overall probability of the filter bank response is evaluated as the product of the response probabilities $$P(\vec{i}, \vec{\mu}, \vec{\sigma}^2) = \prod_{b=1}^{B} p_b(i_b, \mu_b, \sigma_b^2)$$

where $\vec{i}$ is the vector of image responses, $\vec{\mu}$ is the vector of mean image responses, and $\vec{\sigma}^2$ is the vector of image variance responses. The process 310 proceeds to step 350 of FIG. 4A, which is detailed in FIGS. 4C and 4D.

FIG. 4C is a first exemplary process 350' (representing "the likelihood ratio test") for applying a likelihood-based classifier according to the process 300 of FIG. 4A. Process 350' continues from step 314 of the process 310 of FIG. 4B. The process 350' begins with beginning loop step 351, which repeats steps 351 to 355 for each pixel of the current image. In step 352, the likelihood of the estimated mean, given the current data, is determined for the pixel. The likelihood is determined by computing $P(\vec{i}, \vec{\mu}, \vec{\sigma}^2)$, the likelihood of the current data, as described above with reference to step 313 of the process 310. Next, in step 353, the value $\vec{\mu}_0$ is determined that maximizes $P(\vec{i}, \vec{\mu}_0, \vec{\sigma}^2)$. In certain embodiments, the mode of this probability distribution is not expressible in analytic form. In certain embodiments, $\vec{\mu}_0$ can be estimated. Exemplary methods for estimating $\vec{\mu}_0$ include iteratively sampling $P(\vec{i}, \vec{\mu}_0, \vec{\sigma}^2)$ and then updating $\vec{\mu}_0$, approximating $\vec{\mu}_0$ with the mean of the data, and approximating the distribution with an analytic function, and then solving that approximate distribution for an approximate $\vec{\mu}_0$. Next, in step 354, the likelihood ratio for the pixel is computed using the formula $$\lambda = \frac{P(\vec{i}, \vec{\mu}, \vec{\sigma}^2)}{P(\vec{i}, \vec{\mu}_0, \vec{\sigma}^2)}$$

where $\lambda$ is an indicator of normalcy. If $1-\lambda$ is close to 1, a perturbation is likely, but if $1-\lambda$ is close to 0, a perturbation is unlikely. The process 350' in end loop step 355 returns to beginning loop step 351 for the next pixel until no pixels remain. When no pixels remain, in step 366 single-pixel responses are aggregated to classify perturbations. Exemplary classifications include (1) if $\lambda<1$, the pixel is classified as a perturbation, (2) averaging $\lambda$ responses in a local region, then classify the region as a perturbation, or (3) feeding $\lambda$ forward to other processes. The process 350' then ends, thereby completing the process 10 of FIG. 1.

FIG. 4D is a second exemplary process 350" for applying a likelihood-based classifier according to the process 300 of FIG. 4A. Process 350" continues from step 314 of the process 310 of FIG. 4B. Process 350" computes the Bayesian probability of a perturbation given the data and a prior expected probability that any pixel may have a perturbation. The prior probability is denoted as $\pi$. In certain embodiments, process 350" assumes that an image of the expected perturbation is known, with response vector $\vec{r}$. In certain embodiments, process 350" applies when an associated image formation model uses superposition and not occlusion. Process 350" begins with step 371, in which the probability of the data is computed given the perturbation $$P_p = \pi \cdot P(\vec{i}, \vec{\mu}+\vec{r}, \vec{\sigma}^2)$$

Next, in step 371, the probability of the data is computed given no perturbation, as $$P_{\overline{p}} = (1-\pi) \cdot P(\vec{i}, \vec{\mu}, \vec{\sigma}^2)$$

Lastly, in step 373, the probability of a perturbation is computed as $$P = \frac{P_p}{P_p - P_{\bar{p}}}$$

where P is the Bayesian probability (and an indicator) that the pixel contains a perturbation. As with λ above, in step 354 of process 350', P can either be aggregated across neighboring pixels to classify perturbations, individual pixels can be classified, or the P information can be fed forward to other processes. The process 350" then ends, thereby completing the process 10 of FIG. 1.

Figure 4E:
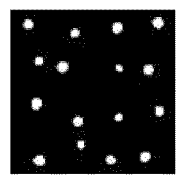
FIG. 4E includes exemplary images of the output images of the process of FIG. 1.
Figure 4E:
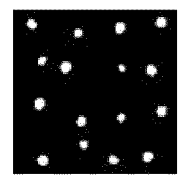
Figure 4E:
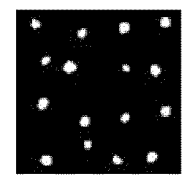
Figure 4E:
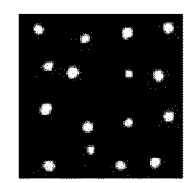
Figure 4F:
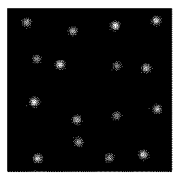
FIG. 4F includes exemplary images of the actual perturbations of the images of FIG. 4E.
Figure 4F:
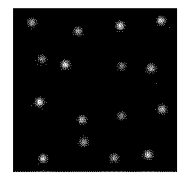
Figure 4F:
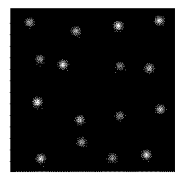
Figure 4F:
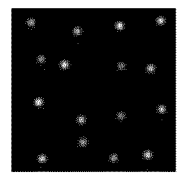

FIG. 4E includes exemplary images 380 of the output images of the process 10 of FIG. 1. The images 380 illustrate the result P for the input images 120 of FIG. 2C. In certain embodiments, there is a lag between the input of images and output of images to facilitate the estimation of image statistics. By way of comparison, the actual perturbations are illustrated in the images 390 of FIG. 4F. In certain embodiments, P is a probability of perturbation and does not attempt to reproduce the intensity of the perturbations.

Figure 5:
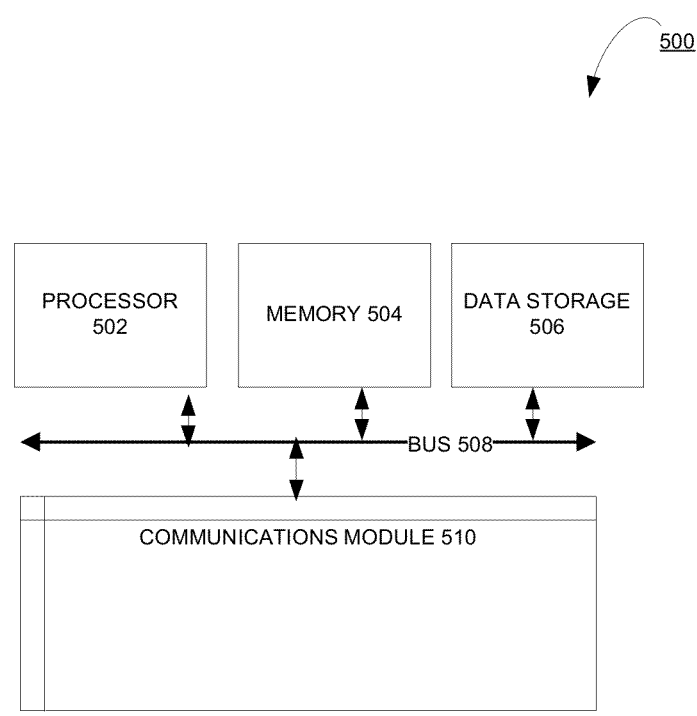
FIG. 5 is a block diagram illustrating an example of a computer system with which the disclosed process of FIG. 1 can be implemented.

FIG. 5 is a block diagram illustrating an example of a computer system 500 with which the disclosed process 10 illustrated in FIG. 1 can be implemented. In certain embodiments, the computer system 500 may be implemented using software, hardware, or a combination of both, either in a dedicated server, or integrated into another entity, or distributed across multiple entities.

Computer system 500 includes a bus 508 or other communication mechanism for communicating information, and a processor 502 coupled with bus 508 for processing information. The processor 502 is configured to conduct the disclosed method. For example, the processor 502 is configured to estimate a local mean and variance for each of a plurality of pixels in the image, analyze a local region of the image, an image mean, and an image variance using a filter bank, thereby generating a plurality of response vectors, determine a likelihood of a local perturbation in the image using a probability distribution based on the plurality of response vectors, and make a classification decision of the local perturbation. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 also includes a memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. In certain embodiments, the image identified in the disclosed process 10 is stored in the memory 504. The instructions may be implemented according to any method well known to those of skill in the art, including, but not limited to, computer languages such as data-oriented languages (e.g., SQL, dBase), system languages (e.g., C, Objective-C, C++, Assembly), architectural languages (e.g., Java), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502. Computer system 500 further includes a data storage device 506 such as a magnetic disk or optical disk, coupled to bus 508 for storing information and instructions. Computer system 500 may be coupled via communications module 560 to various devices. The communications module 510 can be any input/output module. In certain embodiments not illustrated, the communications module 510 is configured to connect to a plurality of devices, such as an input device and/or a display device.

According to one aspect of the present disclosure, the disclosed process 10 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative embodiments, hard-wired circuitry may be used in place of or in combination with software instructions to implement various embodiments of the present disclosure. Thus, embodiments of the present disclosure are not limited to any specific combination of hardware circuitry and software.

The term "machine-readable medium" as used herein refers to any medium or media that participates in providing instructions to processor 502 for execution. For example, one such medium or media includes machine-readable instructions for causing a processor to execute a method for detecting faint perturbations of interest in an image, comprising estimating a local mean and variance for each of a plurality of pixels in the image, analyzing, using a processor, a local region of the image, an image mean, and an image variance using a filter bank, thereby generating a plurality of response vectors, determining a likelihood of a local perturbation in the image using a probability distribution based on the plurality of response vectors, and making a classification decision of the local perturbation. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read.

While certain aspects and embodiments of the invention have been described, these have been presented by way of example only, and are not intended to limit the scope of the invention. Indeed, the novel methods and systems described herein may be embodied in a variety of other forms without departing from the spirit thereof. The accompanying claims and their equivalents are intended to cover such forms or modifications as would fall within the scope and spirit of the invention.

What is claimed is:

1. A method for detecting faint perturbations of interest in an image comprising:
    estimating a local mean and variance for each of a plurality of pixels in the image;
    analyzing, using a processor, a local region of the image, an image mean, and an image variance using a filter bank, thereby generating a plurality of response vectors;
    determining a likelihood of a local perturbation in the image using a probability distribution based on the plurality of response vectors; and
    making a classification decision of the local perturbation, wherein the probability distribution is calculated, for each of the plurality of response vectors, as $$p_b(i_b, \mu_b, \sigma_b^2) = \frac{1}{2\sigma_b^2} e^{-(i_b+\mu_b)/2\sigma_b^2} \left(\frac{i_b}{\mu_b}\right)^{k_b/4-1/2} I_{k_b/2-1}\left(\frac{\sqrt{i_b \mu_b}}{\sigma_b^2}\right),$$

$i_b \geq 0$, and
    wherein $k_b$ is 1 if $q_b=0$, otherwise $k_b$ is 2, and $I_k$ is a modified Bessel function of a first kind.

2. A system for detecting faint perturbations of interest in an image comprising:
    a memory comprising the image; and
    a processor configured to estimate a local mean and variance for each of a plurality of pixels in the image, analyze a local region of the image, an image mean, and an image variance using a filter bank, thereby generating a plurality of response vectors, determine a likelihood of a local perturbation in the image using a probability distribution based on the plurality of response vectors, and make a classification decision of the local perturbation, wherein the probability distribution is calculated, for each of the plurality of response vectors, based on a response of each of the plurality of response vectors to the estimated local mean and variance for each of the plurality of pixels
    wherein the analyzing the local region of the image, the image mean, and the image variance using the set of filters by the processor comprises analyzing each two-dimensional function representing the image, the image mean, or the image variance using a filter bank containing b filters, wherein:
        the $b^{th}$ filter is specified in continuous form as $h_b(\rho,\theta) = R_b(\rho)\exp[\theta q_b \sqrt{-1}]$,
        $(\rho,\theta)$ are polar coordinates $\rho=(x^2+y^2)^{1/2}$ and $\theta = a\tan(y/x)$,
        $q_b$ can be any integer, and $R_b$ can be any radial function except for any two filters $h_b$ and $h_{b'}$, if $q_b = q_{b'}$, then the radial functions must be orthogonal according to the formula $$\int_{\rho=0}^{\infty} \rho R_b(\rho) R_{b'}(\rho) d\rho = 0.$$

3. The method of claim 1, wherein estimating the local mean and variance for each of the plurality of pixels comprises:
    filling up a buffer of images of size N+K, wherein N is greater than or equal to 2, and wherein K is greater than or equal to 1;
    estimating a mean pixel intensity for each of the plurality of pixels; and
    estimating a pixel intensity variance for each of the plurality of pixels.

4. The method of claim 1, wherein estimating the local mean and variance for each of the plurality of pixels further comprises registering the N+K images in the buffer to the current image.

5. A system for detecting faint perturbations of interest in an image comprising:
    a memory comprising the image; and
    a processor configured to estimate a local mean and variance for each of a plurality of pixels in the image, analyze a local region of the image, an image mean, and an image variance using a filter bank, thereby generating a plurality of response vectors, determine a likelihood of a local perturbation in the image using a probability distribution based on the plurality of response vectors, and make a classification decision of the local perturbation,
    wherein the probability distribution is calculated, for each of the plurality of response vectors, based on a response of each of the plurality of response vectors to the estimated local mean and variance for each of the plurality of pixels
    wherein the estimating the local mean and variance for each of the plurality of pixels by the processor comprises:
        estimating a mean pixel intensity using the formula $$\mu_n(x, y) = \sum_{m=1}^{M} b_m \mu_{n-m}(x, y) + \sum_{k=0}^{K} a_k i_{n-k}(x, y),$$

wherein M is an integer greater than or equal to 0, K is an integer greater than 0, and $b_m$ and $a_k$ are coefficients selected to control a filter response;
        estimating a pixel intensity variance using the formula $$s_n^2(x, y) = \sum_{p=1}^{P} c_p s_{n-p}^2(x, y) + \sum_{j=0}^{J} d_j i_{n-j}^2(x, y)$$

$$\sigma_n^2(x, y) = s_n^2(x, y) - [\mu_n(x, y)]^2,$$

wherein P is an integer greater than or equal to 0, J is an integer greater than 0, and $c_p$ and $d_j$ are coefficients selected to control the filter response; and estimating a current image using the formula $$\mu_n(x, y) = \sum_{m=1}^{M} b_m \mu_{n-m}(x, y) + \sum_{k=0}^{K} a_k i_{n-k}(x, y).$$

6. A method for detecting faint perturbations of interest in an image comprising:
   estimating a local mean and variance for each of a plurality of pixels in the image;
   analyzing, using a processor, a local region of the image, an image mean, and an image variance using a filter bank, thereby generating a plurality of response vectors;
   determining a likelihood of a local perturbation in the image using a probability distribution based on the plurality of response vectors; and
   making a classification decision of the local perturbation,
   wherein the probability distribution is calculated, for each of the plurality of response vectors, based on a response of each of the plurality of response vectors to the estimated local mean and variance for each of the plurality of pixels,
   wherein analyzing the local region of the image, the image mean, and the image variance using the set of filters comprises analyzing each two-dimensional function representing the image, the image mean, or the image variance using a filter bank containing b filters, wherein:
   the $b^{th}$ filter is specified in continuous form as $h_b(\rho,\theta) = R_b(\rho)\exp\lfloor \theta q_b \sqrt{-1} \rfloor$,
   $(\rho,\theta)$ are polar coordinates $\rho=(x^2+y^2)^{1/2}$ and $\theta=a\tan(y/x)$,
   $q_b$ can be any integer, and
   $R_b$ can be any radial function except for any two filters $h_b$ and $h_{b'}$, if $q_b = q_{b'}$, then the radial functions must be orthogonal according to the formula $$\int_{\rho=0}^{\infty} \rho R_b(\rho) R_{b'}(\rho) \, d\rho = 0.$$

7. The method of claim 1, wherein the steps of determining a likelihood of a local perturbation in the image using a probability distribution based on the plurality of response vectors, and making a classification decision of the local perturbation, comprise:
   obtaining a probability distribution; and
   applying a likelihood-based classifier.

8. The method of claim 7, wherein the obtaining the probability distribution comprises, for each of a plurality of filter bank responses:
   evaluating a probability of the filter bank response as $$p_b(i_b, \mu_b, \sigma_b^2) = \frac{1}{2\sigma_b^2} e^{-(i_b+\mu_b)/2\sigma_b^2} \left(\frac{i_b}{\mu_b}\right)^{k_b/4-1/2} I_{k_b/2-1}\left(\frac{\sqrt{i_b \mu_b}}{\sigma_b^2}\right),$$

$i_b \geq 0$, wherein $k_b$ is 1 if $q_b = 0$, otherwise $k_b$ is 2, and $I_k$ is a modified Bessel function of a first kind; and evaluating an overall probability of the filter bank response as the product of a plurality of response probabilities $$P(\vec{i}, \vec{\mu}, \vec{\sigma}^2) = \prod_{b=1}^{B} p_b(i_b, \mu_b, \sigma_b^2),$$

wherein
$\vec{i}$ is the vector of image responses, $\vec{\mu}$ is the vector of mean image responses, and $\vec{\sigma}^2$ is the vector of image variance responses.

9. The method of claim 7, wherein the applying the likelihood-based classifier comprises:
   for each of the plurality of pixels:
   determining a likelihood of an estimated mean for the pixel;
   determining a value $\vec{\mu}_0$ that maximizes $P(\vec{i}, \vec{\mu}_0, \vec{\sigma}^2)$; and
   computing a likelihood ratio $$\lambda = \frac{P(\vec{i}, \vec{u}, \vec{\sigma}^2)}{P(\vec{i}, \vec{u}_0, \vec{\sigma}^2)}$$

for the pixel; and
   aggregating single-pixel responses to make the classification decision of the local perturbation.

10. The method of claim 7, wherein the applying the likelihood-based classifier comprises:
   computing a first probability given a perturbation $P_p = \pi \cdot P(\vec{i}, \vec{\mu}+\vec{r}, \vec{\sigma}^2)$;
   computing a second probability $P_{\bar{p}} = (1-\pi) \cdot P(\vec{i}, \vec{\mu}, \vec{\sigma}^2)$ given no perturbation; and
   computing the probability of the perturbation $$P = \frac{P_p}{P_p - P_{\bar{p}}},$$

wherein P is a Bayesian probability that a pixel contains a target.

11. A system for detecting faint perturbations of interest in an image comprising:
   a memory comprising the image; and
   a processor configured to estimate a local mean and variance for each of a plurality of pixels in the image, analyze a local region of the image, an image mean, and an image variance using a filter bank, thereby generating a plurality of response vectors, determine a likelihood of a local perturbation in the image using a probability distribution based on the plurality of response vectors, and make a classification decision of the local perturbation,
   wherein the probability distribution is calculated, for each of the plurality of response vectors, as $$p_b(i_b, \mu_b, \sigma_b^2) = \frac{1}{2\sigma_b^2} e^{-(i_b+\mu_b)/2\sigma_b^2} \left(\frac{i_b}{\mu_b}\right)^{k_b/4-1/2} I_{k_b/2-1}\left(\frac{\sqrt{i_b \mu_b}}{\sigma_b^2}\right),$$

$i_b \geq 0$, and
   wherein $k_b$ is 1 if $q_b = 0$, otherwise $k_b$ is 2, and $I_k$ is a modified Bessel function of a first kind.

12. A method for detecting faint perturbations of interest in an image comprising:
  estimating a local mean and variance for each of a plurality of pixels in the image;
  analyzing, using a processor, a local region of the image, an image mean, and an image variance using a filter bank, thereby generating a plurality of response vectors;
  determining a likelihood of a local perturbation in the image using a probability distribution based on the plurality of response vectors; and
  making a classification decision of the local perturbation,
  wherein the probability distribution is calculated, for each of the plurality of response vectors, based on a response of each of the plurality of response vectors to the estimated local mean and variance for each of the plurality of pixels,
  wherein estimating the local mean and variance for each of the plurality of pixels comprises:
    estimating a mean pixel intensity using the formula $$\mu_n(x, y) = \sum_{m=1}^{M} b_m \mu_{n-m}(x, y) + \sum_{k=0}^{K} a_k i_{n-k}(x, y),$$

wherein M is an integer greater than or equal to 0, K is an integer greater than 0, and $b_m$ and $a_k$ are coefficients selected to control a filter response;
    estimating a pixel intensity variance using the formula $$s_n^2(x, y) = \sum_{p=1}^{P} c_p s_{n-p}^2(x, y) + \sum_{j=0}^{J} d_j i_{n-j}^2(x, y)$$

$$\sigma_n^2(x, y) = s_n^2(x, y) - [\mu_n(x, y)]^2,$$

wherein P is an integer greater than or equal to 0, J is an integer greater than 0, and $c_p$ and $d_j$ are coefficients selected to control the filter response; and
    estimating a current image using the formula $$\mu_n(x, y) = \sum_{m=1}^{M} b_m \mu_{n-m}(x, y) + \sum_{k=0}^{K} a_k i_{n-k}(x, y).$$

13. The system of claim 11, wherein the estimating the local mean and variance for each of the plurality of pixels by the processor comprises:
  filling up a buffer of images of size N+K, wherein N is greater than or equal than 2, and wherein K is greater than 0;
  estimating a mean pixel intensity for each of the plurality of pixels; and
  estimating a pixel intensity variance for each of the plurality of pixels.

14. The system of claim 11, wherein the estimating the local mean and variance for each of the plurality of pixels by the processor further comprises registering the N+K images in the buffer to the current image.

15. A non-transitory machine-readable medium comprising machine-readable instructions for causing a processor to execute a method for detecting faint perturbations of interest in an image comprising:
  estimating a local mean and variance for each of a plurality of pixels in the image;
  analyzing, using a processor, a local region of the image, an image mean, and an image variance using a filter bank, thereby generating a plurality of response vectors;
  determining a likelihood of a local perturbation in the image using a probability distribution based on the plurality of response vectors; and
  making a classification decision of the local perturbation,
  wherein the probability distribution is calculated, for each of the plurality of response vectors, as $$p_b(i_b, \mu_b, \sigma_b^2) = \frac{1}{2\sigma_b^2} e^{-(i_b+\mu_b)/2\sigma_b^2} \left(\frac{i_b}{\mu_b}\right)^{k_b/4 - 1/2} I_{k_b/2-1}\left(\frac{\sqrt{i_b \mu_b}}{\sigma_b^2}\right),$$

$i_b \geq 0$, and
  wherein $k_b$ is 1 if $q_b = 0$, otherwise $k_b$ is 2, and $I_k$ is a modified Bessel function of a first kind.

16. The system of claim 11, wherein the determining a likelihood of a local perturbation in the image using a probability distribution based on the plurality of response vectors, and the making a classification decision of the local perturbation by the processor, comprise:
  obtaining a probability distribution; and
  applying a likelihood-based classifier.

17. The system of claim 16, wherein the obtaining the probability distribution by the processor comprises, for each of a plurality of filter bank responses:
  evaluating a probability of the filter bank response as $$p_b(i_b, \mu_b, \sigma_b^2) = \frac{1}{2\sigma_b^2} e^{-(i_b+\mu_b)/2\sigma_b^2} \left(\frac{i_b}{\mu_b}\right)^{k_b/4 - 1/2} I_{k_b/2-1}\left(\frac{\sqrt{i_b \mu_b}}{\sigma_b^2}\right),$$

$i_b \geq 0$, wherein $k_b$ is 1 if $q_b = 0$, otherwise $k_b$ is 2, and $I_k$ is a modified Bessel function of a first kind; and
  evaluating an overall probability of the filter bank response as the product of a plurality of response probabilities $$P(\vec{i}, \vec{\mu}, \vec{\sigma}^2) = \prod_{b=1}^{B} p_b(i_b, \mu_b, \sigma_b^2),$$

wherein
  $\vec{i}$ is the vector of image responses, $\vec{\mu}$ is the vector of mean image responses, and $\vec{\sigma}^2$ is the vector of image variance responses.

18. The system of claim 16, wherein the applying the likelihood-based classifier by the processor comprises:
  for each of the plurality of pixels:
    determining a likelihood of an estimated mean for the pixel;
    determining a value $\vec{\mu}_0$ that maximizes $P(\vec{i}, \vec{\mu}_0, \vec{\sigma}^2)$; and
    computing a likelihood ratio $$\lambda = \frac{P(\vec{i}, \vec{u}, \vec{\sigma}^2)}{P(\vec{i}, \vec{u}_0, \vec{\sigma}^2)}$$

for the pixel; and
  aggregating single-pixel responses to make the classification decision of the local perturbation.

19. The system of claim 16, wherein the applying the likelihood-based classifier by the processor comprises:

computing a first probability given a perturbation $P_p = \pi \cdot P(\vec{1}, \vec{\mu} + \vec{r}, \vec{\sigma}^2)$;

computing a second probability $P_{\bar{p}} = (1-\pi) \cdot P(\vec{1}, \vec{\mu}, \vec{\sigma}^2)$ given no perturbation; and computing the probability of the perturbation $$P = \frac{P_p}{P_p - P_{\bar{p}}},$$

wherein P is a Bayesian probability that a pixel contains a target.

* * * * *